United States Patent [19]
Ishizaka et al.

[11] Patent Number: 5,655,034
[45] Date of Patent: Aug. 5, 1997

[54] MACH-ZEHNDER TYPE MODULATOR AND METHOD OF DRIVING THE SAME

[75] Inventors: Masashige Ishizaka; Junichi Shimizu, both of Tokyo, Japan

[73] Assignee: NEC Corporation, Japan

[21] Appl. No.: 710,809

[22] Filed: Sep. 23, 1996

[30] Foreign Application Priority Data

Sep. 28, 1995 [JP] Japan .................................. 7-273687

[51] Int. Cl.⁶ .............................. G02B 6/00; G02F 1/035
[52] U.S. Cl. ..................................................... 385/3
[58] Field of Search .............................. 385/1, 2, 8, 9, 385/15, 3; 359/245, 187, 315

[56] References Cited

U.S. PATENT DOCUMENTS

| | | | |
|---|---|---|---|
| 5,488,503 | 1/1996 | Schaffner et al. | 359/245 |
| 5,528,707 | 6/1996 | Sullivan et al. | 385/2 |
| 5,548,668 | 8/1996 | Schaffner | 385/2 |

OTHER PUBLICATIONS

Sano et al; "High speed properties of InGaAs/InAlAs MQW Mach-Zehender optical modulators"; 1993; pp. 4–187; Proceedings of the 1993 IEICE, Spring Conference, Book 4, Lecture No. C-151.

Sano et al; "High-speed InGaAs/InAlAs MQW Mach-Zehnder-type optical modulator". 1993; pp. 215–217; OFC/IOOC '93 Technical Digest, Thursday Afternoon, 1993.

Ishizaka et al; "Analysis on Chirping Characteristics of MQW Mach-Zehnder Modulator with Absorption Loss"; 1994; p. 173; Proceedings of the 1994 IEICE Autumn Conference, Book 1, Lecture No. C-173.

*Primary Examiner*—Akm E. Ullah
*Attorney, Agent, or Firm*—Hayes, Soloway, Hennessey, Grossman & Hage, P.C.

[57] ABSTRACT

A Mach-Zehnder modulator has a first waveguide path, a second waveguide path and first and second phase modulator sections respectively formed in the first and second waveguide paths. Those two waveguide paths have different equivalent refractive indexes so that with no modulation electric signal applied to the first and second phase modulator sections, lights waveguided through the first and second phase modulator sections have a phase difference of $(2N+1)\pi$ (N: 0 or a positive integer). No voltage or a constant voltage is applied to the second phase modulator section, and a modulation signal is applied to the electrode of the first phase modulator section. When a voltage of 0 is applied to the first phase modulator section, a light OFF state is acquired, and when a voltage of $V\pi$ is applied to the first phase modulator section, a light ON state is acquired. Therefore, negative chirping is generated at the light ON time and the light OFF time.

6 Claims, 8 Drawing Sheets

$$C = \sqrt{A^2 + B^2 + 2A \cdot B \cos(\Delta \beta L)}$$

$$\Delta \beta = \beta_1 - \beta_2, \quad A = E_1 e^{-\frac{\alpha_1}{2}L}, \quad B = E_2 e^{-\frac{\alpha_2}{2}L}$$

$$\phi = \overline{\beta} L + \tan^{-1}\left\{ \frac{A-B}{A+B} \tan\left(\frac{\Delta \beta}{2} L\right) \right\}$$

$$\overline{\beta} = \frac{\beta_1 + \beta_2}{2}$$

MACH-ZEHNDER TYPE MODULATOR AND METHOD OF DRIVING THE SAME

BACKGROUND OF THE INVENTION

1. Field of the Invention

The present invention relates to a Mach-Zehnder type modulator which is an important device in an optical transmission system and an optical information processing system, and a method of driving the modulator. More particularly, this invention relates to a Mach-Zehnder type modulator which can prevent the generation of positive wavelength chirping even when a modulation electric signal is applied only to one phase modulator section, and a method of driving this modulator.

2. Description of the Related Art

Conventionally, a waveguide type optical device, such as a semiconductor laser or an optical modulator, is considered as one of important devices in a fast optical transmission system and optical information processing system, and the research and development on such optical devices become active.

In accordance with the recent improvement on the speed and transmission length of optical transmission systems, however, the problem of the conventional direct modulation system by a semiconductor laser is surfaced. In the direct modulation system by a semiconductor laser, wavelength chirping occurs at the time of modulation, thus degrading the waveform after fiber transmission. The faster the signal transfer speed is and the longer the signal transmission length becomes, the more prominent this waveform degradation becomes.

The waveform degradation is a significant problem particularly in a system using a 1.3 μm dispersion fiber. This is because even if a light source with a low fiber transfer loss, e.g., a light source whose wavelength lies in a 1.55 μm band, is used to extend the transmission length, the transmission length is limited by the chirping-originated dispersion restriction. This problem can be overcome by employing an external modulation system which causes a semiconductor laser to emit a constant optical output and modulate the emitted light from the semiconductor laser with an optical modulator other then the semiconductor laser. In this respect, the development on external optical modulators which externally modulate the emitted light from a semiconductor laser is recently in progress.

Such external optical modulators include a type which uses a dielectric like LiNbO$_3$ and a type which uses a semiconductor like InP or GaAs. There is an increased expectation for the semiconductor optical modulators, among those different types of external optical modulators, which can be designed into an integrated circuit with another optical device like an optical amplifier or an electronic circuit like an FET and whose miniaturization and consumed power reduction can easily be accomplished. Typical type of semiconductor optical modulators are an absorption type optical modulator and a Mach-Zehnder (MZ) type modulator. The absorption type optical modulator utilizes the effect of shifting the light absorption end toward the long wavelength side by applying an electric field to a semiconductor as in the Franz-Keldish effect of a bulk semiconductor or a Quantum-Confined Stark Effect of a multiple quantum wells (MQW) structure. The MZ modulator utilizes the effect of changing the refractive index by applying an electric field to a semiconductor as in the electro-optical effect (Pockels effect) of a bulk semiconductor or the Quantum-Confined Stark Effect of an MQW structure.

The absorption type optical modulator, which is one of the external modulation type semiconductor optical modulators, can achieve significantly small wavelength chirping as compared with the semiconductor laser direct modulation type, but cannot achieve zero wavelength chirping. The MZ modulator can in principle achieve zero or negative wavelength chirping, and is thus expected to be a modulator for the future super fast long distance optical transmission. Proposed as one example of a semiconductor MZ modulator is a high mesa type MZ modulator which has an InGaAs/InAlAs multiple quantum wells as a waveguide layer (see Sano et al., Proceedings of the 1993 IEICE (the Institute of Electronics, Information and Communication Engineers) Spring Conference, Book 4, pp. 4–187 (Lecture No. C-151) and Sano et al., OFC/IOOC '93 Technical Digest, Thursday Afternoon, pp. 215–217, 1993).

In this high mesa type MZ modulator, for example, 6.5 nm InGaAs well layer and 6.0 nm InAlAs barrier layer constitutes MQW with respect to the incident-light wavelength of 1.55 μm, and the band-gap wavelength is set to 1.45 μm. The waveguide layer has 30-period MQW's of InGaAS/InAlAs and has a device length of 1.2 mm, and two phase modulator sections to which an electric field is applied have the same length (e.g., 0.5 mm) and the same structure. For this device, the modulation voltage (half-wavelength voltage) with respect to the incident-light having a wavelength of 1.55 μm is 4.2 V, an extinction ratio is 13 dB and the fiber insertion loss is 12 dB.

An MZ modulator, fabricated by using a semiconductor material, particularly, one having an MQW structure as a refractive-index variable medium, has a size of approximately 1 mm, which is extremely small as compared with the size of an MZ modulator (10 mm) which uses a dielectric material like LiNbO$_3$.

As a method of driving a semiconductor MZ modulator, a driving method which involves a ridge waveguide type MZ modulator having InGaAs/InP MQW's as a waveguide layer was reported (Ishizaka et al., Proceedings of the 1994 IEICE (the Institute of Electronics, Information and Communication Engineers) Autumn Conference, Book 1, p. 173 (Lecture No. C-173)). This report describes the results of analysis on wavelength chirping by using a ridge waveguide type MZ modulator to modulate light by a half modulation system (single electrode driving system) or a push-pull modulation system.

Figure 1:
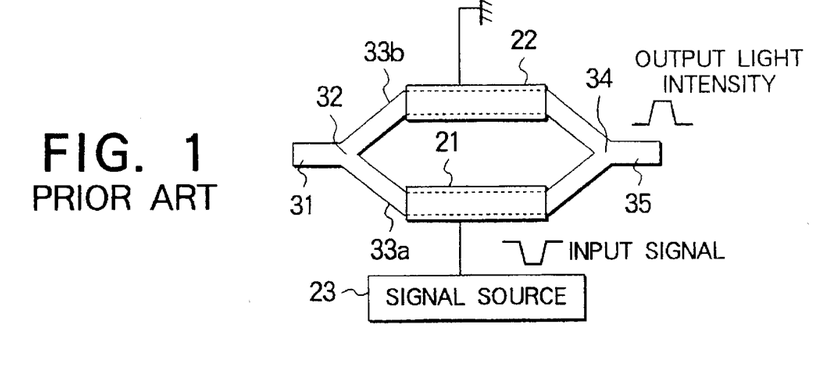
FIG. 1 is an exemplary diagram showing a modulation method based on the half modulation system which uses a ridge waveguide type MZ modulator.

The half modulation system will be described first. FIG. 1 is an exemplary diagram showing a modulation method based on the half modulation system which uses a ridge waveguide type MZ modulator. This modulator device has an incident-light waveguide path 31 for waveguiding incident light, a splitter 32 for splitting the waveguided light to two, two waveguide paths (first waveguide path 33a and second waveguide path 33b) branched from the splitter 32, a mixer 34 for synthesizing the output lights from the two waveguide paths, and an outgoing-light waveguide path 35 which waveguides the synthesized light. A first phase modulator section 21 and a second phase modulator section 22 are respectively formed in the first waveguide path 33a and the second waveguide path 33b. The second phase modulator section 22 in the second waveguide path 33b is electrically grounded, while the first phase modulator section 21 in the first waveguide path 33a is connected to a signal source 23 so that a voltage corresponding to an electric signal can be applied to the first phase modulator section 21 from the signal source 23.

Figure 2A:
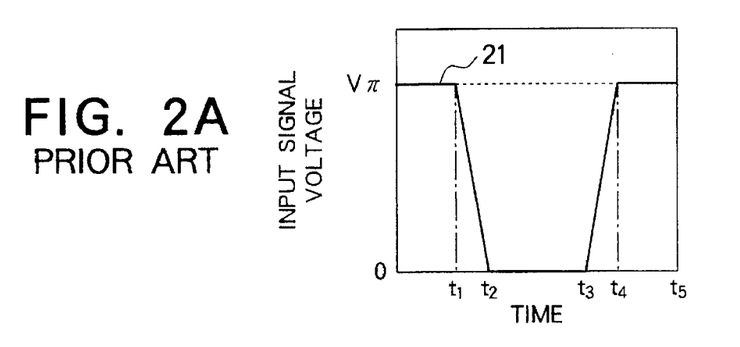
FIG. 2A is a graph showing a modulation electric signal to be applied to a first phase modulator section in a half modulation mode.
Figure 2B:
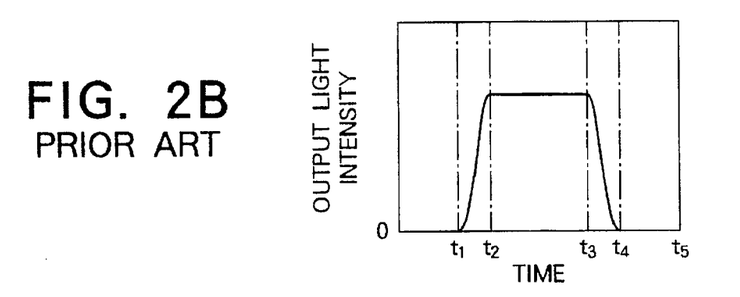
FIG. 2B is a graph showing the intensity of output light.
Figure 2C:
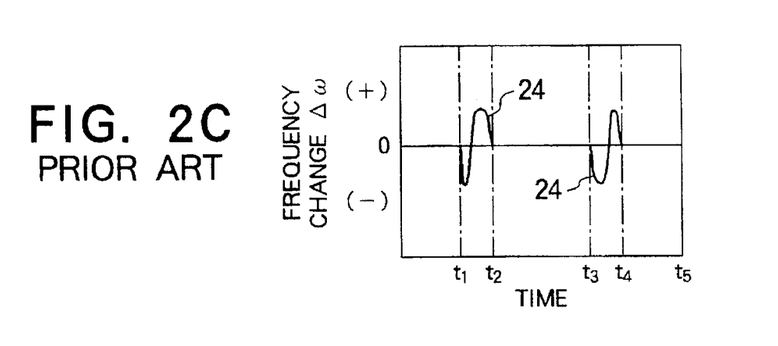
FIG. 2C is a graph showing a frequency change of output light.

FIG. 2A is a graph which shows a modulation electric signal to be applied to the first phase modulator section 21 by the half modulation system by plotting the input signal voltage on the vertical scale and time on the horizontal scale, FIG. 2B is a graph which shows the intensity of output light by plotting the output light intensity on the vertical scale and time on the horizontal scale, and FIG. 2C is a graph showing a frequency change of output light by plotting a frequency change on the vertical scale and time on the horizontal scale. To modulate light by the half modulation system using the modulator designed as shown in FIG. 1, a voltage of $V\pi$ (0-$t_1$, $t_4$-$t_5$) or a voltage of 0 ($t_2$-$t_3$) from the signal source 23 is applied as a modulation input signal the first phase modulator section 21 in the first waveguide path 33a, as shown in FIG. 2A. It is apparent from FIG. 2B that when the voltage of $V\pi$ is applied to the first phase modulator section 21, the light OFF state is acquired, and when the voltage of 0 is applied to the first phase modulator section 21, the light ON state is acquired. While the light incident to the incident-light waveguide path 31 is waveguided through the splitter 32, the first and second waveguide paths 33a and 33b and the mixer 34, the light is modulated by the modulation input signal and the modulated light comes out from the outgoing-light waveguide path 35.

As shown in FIG. 2C, however, this half modulation system generates a positive chirping component 24 at the point of the light ON ($t_1$-$t_2$) or the light OFF ($t_3$-$t_4$). The positive chirping is a time-dependent frequency change such that the frequency change of a light wave shows a positive value when the light output intensity increases (light ON time) and this frequency change shows a negative value when the light output intensity decreases (light OFF time). When such positive chirping occurs, the waveform of the light output signal spreads and is degraded as it propagates.

Figure 3:
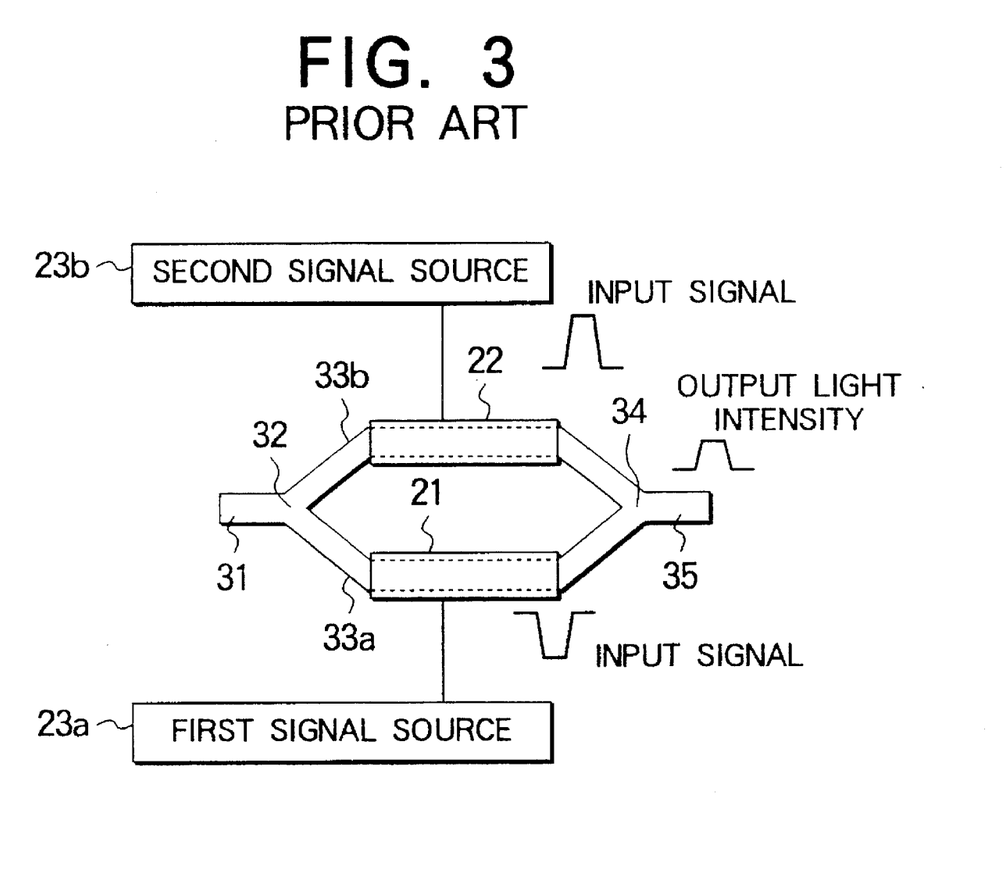
FIG. 3 is an exemplary diagram showing a modulation method based on the push-pull modulation system which uses a ridge waveguide type MZ modulator.
Figure 4A:
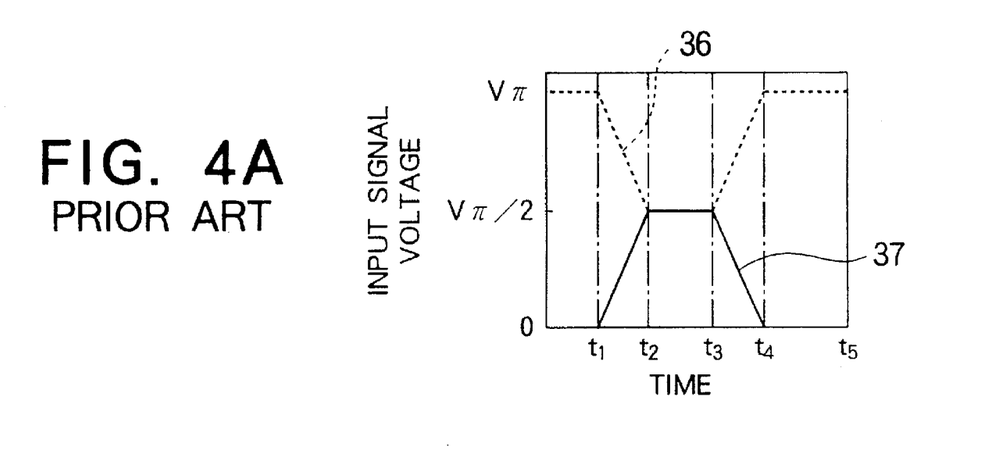
FIG. 4A is a graph showing a modulation electric signal to be applied to first and second phase modulator sections in a push-pull modulation mode.
Figure 4B:
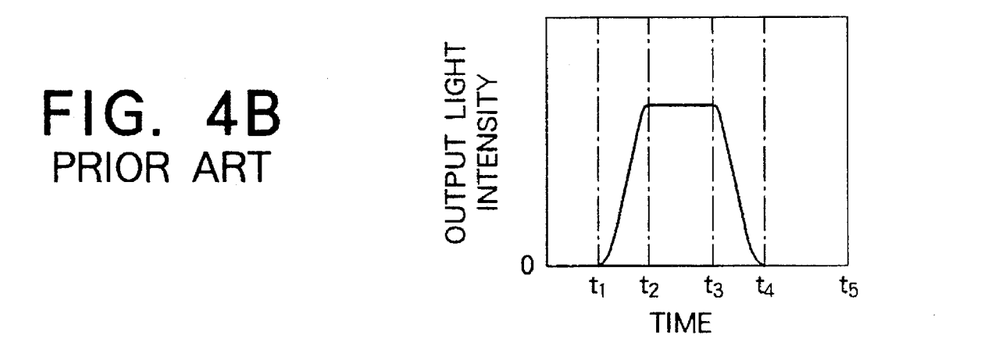
FIG. 4B is a graph showing the intensity of output light.

The push-pull modulation system will now be described. FIG. 3 is an exemplary diagram showing a modulation method based on the push-pull modulation system which uses a ridge waveguide type MZ modulator. The device shown in FIG. 3 differs from the one in FIG. 1 only in that a first signal source 23a and a second signal source 23b are respectively connected to the first phase modulator section 21 and the second phase modulator section 22. To avoid the redundant description, therefore, like or same reference numerals are given to those components in FIG. 3 which are the same as the corresponding components shown in FIG. 1. FIG. 4A is a graph which shows a modulation electric signal to be applied to the first phase modulator section 21 and the second phase modulator section 22 in the push-pull modulation mode by plotting the input signal voltage on the vertical scale and time on the horizontal scale, FIG. 4B is a graph which shows the intensity of output light by plotting the output light intensity on the vertical scale and time on the horizontal scale, and FIG. 4C is a graph showing a frequency change of output light by plotting a frequency change on the vertical scale and time on the horizontal scale.

To modulate light by the push-pull modulation system using the modulator designed as shown in FIG. 3, signal voltages of the opposite phases are applied as modulation input signals to both phase modulator sections 21 and 22. As shown in FIG. 4A, for example, a voltage of $V\pi$ (0-$t_1$, $t_4$-$t_5$) or a voltage of ($V\pi/2$) 36 ($t_2$-$t_3$) from the first signal source 23a is applied to the first phase modulator section 21 in the first waveguide path 33a. A voltage of 0 (0-$t_1$, $t_4$-$t_5$) or a voltage of ($V\pi/2$) 37 ($t_2$-$t_3$) from the second signal source 23b is applied to the second phase modulator section 22 in the second waveguide path 33b. It is apparent from FIG. 4B that when the voltage of $V\pi$ and the voltage of 0 are respectively applied to the first phase modulator section 21 and the second phase modulator section 22, the light OFF state is acquired, and when the voltage of ($V\pi/2$) is applied to both the first and second phase modulator sections 21 and 22, the light ON state is acquired. While the light incident to the incident-light waveguide path 31 is waveguided through the splitter 32, the first and second waveguide paths 33a and 33b and the mixer 34, the light is modulated by the modulation input signal and the modulated light comes out from the outgoing-light waveguide path 35.

Figure 4C:
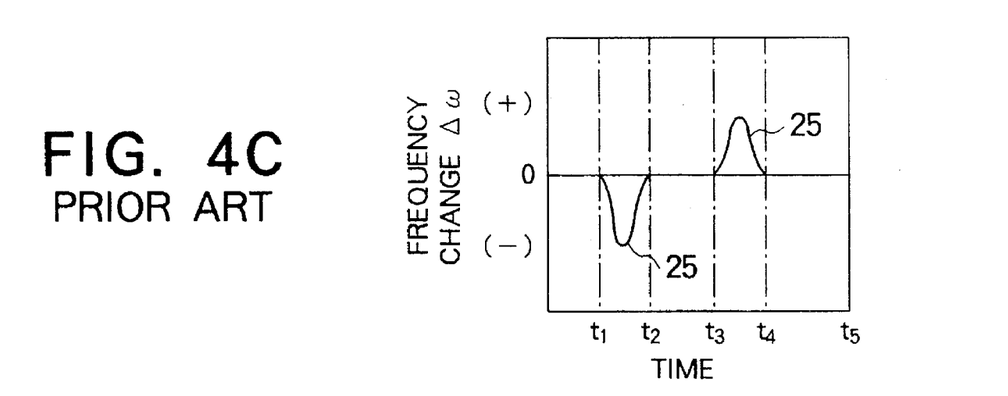
FIG. 4C is a graph showing a frequency change of output light.

As shown in FIG. 4C, this push-pull modulation system generates a negative chirping component 25 at the point of the light ON ($t_1$-$t_2$) or the light OFF ($t_3$-$t_4$). The negative chirping is a time-dependent frequency change such that the frequency change of a light wave shows a negative value when the light output intensity increases (light ON time) and this frequency change shows a positive value when the light output intensity decreases (light OFF time). When such negative chirping occurs, the degradation of a signal waveform which is caused by the dispersion of the optical fiber can be suppressed by the waveform compression.

Since this push-pull modulation system needs different voltages to be applied to both phase modulator sections 21 and 22, however, the drive system for the electric circuit, the signal transmission path and the like which transmit an electric signal becomes complicated. It is therefore difficult to adapt the push-pull type MZ modulator for use in an actual optical transmission system.

SUMMARY OF THE INVENTION

Accordingly, it is an object of the present invention to provide an MZ modulator which uses a single electrode driving system and can generate a negative chirping component, and a method of driving the same.

An MZ modulator according to this invention has a substrate and a device formed on the substrate. This device has an incident-light waveguide path for waveguiding incident light, a splitter for splitting light waveguided by the incident-light waveguide path to two, first and second waveguide for waveguiding lights split by the splitter, a mixer for synthesizing output light from the first waveguide path and output light from the second waveguide path, and an outgoing-light waveguide path for guiding synthesized light from the mixer. The first waveguide path has a first phase modulator section to which a modulation electric signal is applied, and the second waveguide path has a second phase modulator section.

The first waveguide path and the second waveguide path have different equivalent refractive indexes so that with no modulated electric signal applied to the first phase modulator section, lights waveguided through the first phase modulator section and the second phase modulator section have a phase difference of $(2N+1)\pi$ (N: 0 or a positive integer).

In this Mach-Zehnder modulator, each of the first waveguide path and the second waveguide path is comprised of a semiconductor layer and a clad layer formed on the semiconductor layer, the clad layer constituting the first waveguide path has a thickness different from that of the clad layer constituting the second waveguide path so that the equivalent refractive indexes of the first and second waveguide paths differ from each other, and with no modulation electric signal applied to the first phase modulator section, lights waveguided through the first phase modulator section and the second phase modulator section have a phase difference of $(2N+1)\pi$ (N: 0 or a positive integer) in a case where no modulation electric signal is applied to the first phase modulator section.

Alternatively, each of the first waveguide path and the second waveguide path is comprised of a semiconductor layer, the semiconductor layer constituting the first waveguide path has a refractive index different from that of the semiconductor layer constituting the second waveguide path so that the equivalent refractive indexes of the first and second waveguide paths differ from each other, lights waveguided through the first phase modulator section and the second phase modulator section have a phase difference of $(2N+1)\pi$ (N: 0 or a positive integer) in a case where no modulation electric signal is applied to the first phase modulator section.

Another MZ modulator according to this invention has a substrate and a device formed on the substrate. This device has an incident-light waveguide path for waveguiding incident light, a splitter for splitting light waveguided by the incident-light waveguide path to two, first and second waveguide paths for waveguiding lights split by the splitter, a mixer for synthesizing output light from the first waveguide path and output light from the second waveguide path, and an outgoing-light waveguide path for guiding synthesized light from the mixer. The first waveguide path has a first phase modulator section to which a modulation electric signal is applied, and the second waveguide path has a second phase modulator section.

The first waveguide path and the second waveguide path have different equivalent refractive indexes and a phase adjusting electrode is provided in at least one of the first and second waveguide paths to apply a voltage to light waveguided through the at least one of the first and second waveguide paths to adjust a phase of the waveguide light, so that with no modulated electric signal applied to the first phase modulator section, lights waveguided through the first phase modulator section and the second phase modulator section have a phase difference of $(2N+1)\pi$ (N: 0 or a positive integer).

According to this invention, there is provided a method of driving a Mach-Zehnder modulator having a substrate and a device formed on the substrate. This device has an incident-light waveguide path for waveguiding incident light, a splitter for splitting light waveguided by the incident-light waveguide path to two, first and second waveguide paths for waveguiding lights split by the splitter, a mixer for synthesizing output light from the first waveguide path and output light from the second waveguide path, and an outgoing-light waveguide path for guiding synthesized light from the mixer. The first waveguide path has a first phase modulator section to which a modulation electric signal is applied, the second waveguide path has a second phase modulator section.

According to this MZ modulator driving method, a constant voltage is applied to the second phase modulator section and a modulation electric signal is applied to the first phase modulator section in such a manner that with no modulation electric signal applied to the first phase modulator section, lights waveguided through the first phase modulator section and the second phase modulator section have a phase difference of $(2N+1)\pi$ (N: 0 or a positive integer), thereby generating negative chirping on a signal of outgoing light from the outgoing-light waveguide path.

According to this invention, there is provided another method of driving a Mach-Zehnder modulator having a substrate and a device formed on the substrate. The device has an incident-light waveguide path for waveguiding incident light, a splitter for splitting light waveguided by the incident-light waveguide path to two, first and second waveguide paths for waveguiding lights split by the splitter, a mixer for synthesizing output light from the first waveguide path and output light from the second waveguide path, and an outgoing-light waveguide path for guiding synthesized light from the mixer. The first waveguide path has a first phase modulator section to which a modulation electric signal is applied, the second waveguide path has a second phase modulator section, and lights waveguided through the first phase modulator section and the second phase modulator section have a phase difference of $(2N+1)\pi$ (N: 0 or a positive integer) in the case where no modulation electric signal is applied to the first phase modulator section.

In this MZ modulator driving method, a modulation electric signal is applied to the first phase modulator section without applying a voltage to the second phase modulator section, thereby generating negative chirping on a signal of outgoing light from the outgoing-light waveguide path.

Because the structures of the phase modulator sections in a semiconductor MZ modulator or the method of driving the phase modulator sections is selected so that lights waveguided through the first phase modulator section and the second phase modulator section have a phase difference of $(2N+1)\pi$ (N: 0 or a positive integer), a negative chirping characteristic suitable for long distance transmission can be obtained by the system which applies a signal voltage only to the electrode of one of the phase modulator sections. This structure can simplify the drive system for the electric circuit, the signal transmission path and the like which transmit an electric signal and can thus reduce the load on designing a long distance optical transmission system.

DETAILED DESCRIPTION OF THE PREFERRED EMBODIMENTS

Figure 5:
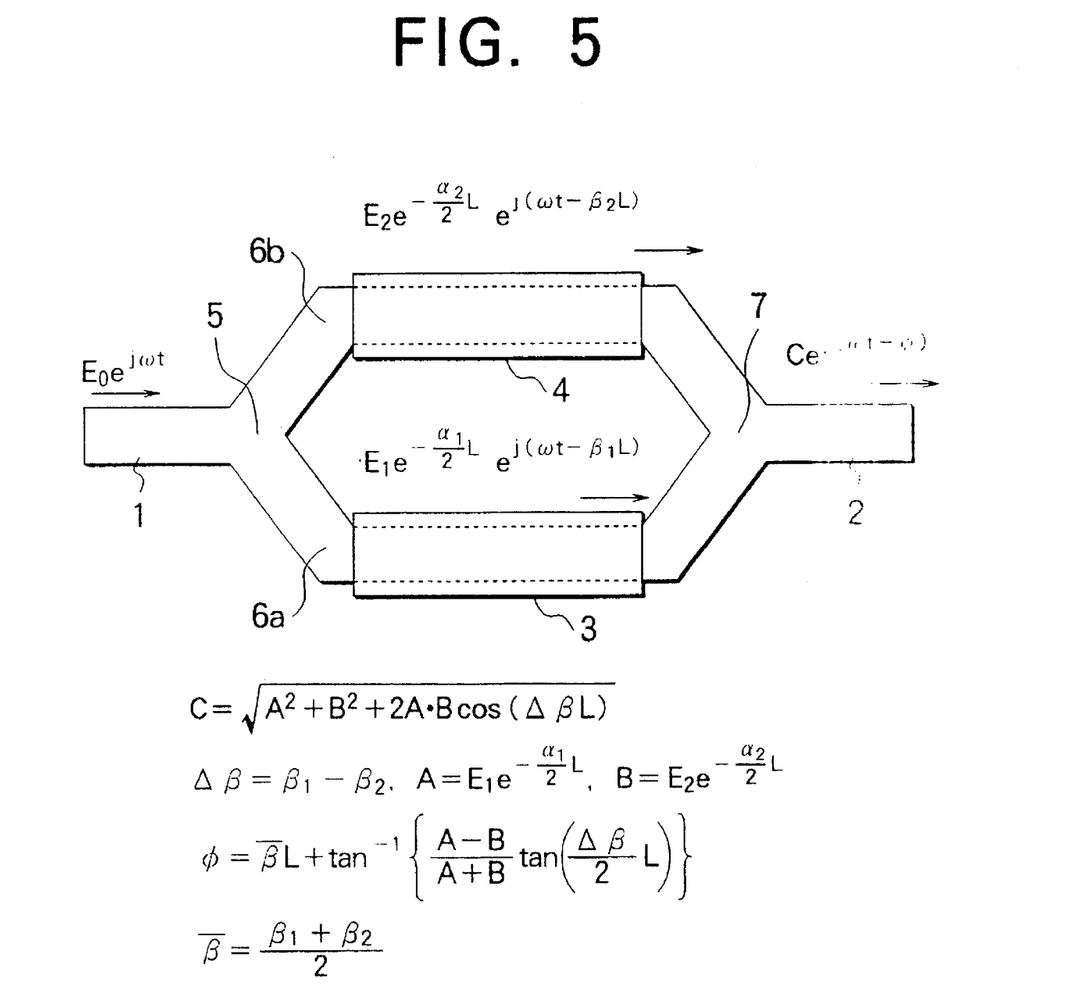
FIG. 5 is an exemplary diagram illustrating the structure of an MZ modulator embodying this invention.

Preferred embodiments of the present invention will now be described specifically with reference to the accompanying drawings. FIG. 5 is an exemplary diagram illustrating the structure of an MZ modulator embodying this invention. A device in the MZ modulator has an incident-light waveguide path 1 for waveguiding incident light, a splitter 5 for splitting the waveguided light to two, a first waveguide path 6a and a second waveguide path 6b branched from the splitter 5, a mixer 7 for synthesizing the output lights from the two waveguide paths 6a and 6b, and an outgoing-light waveguide path 2 which waveguides the synthesized light. A first phase modulator section 3 and a second phase modulator section 4 are respectively formed in the first waveguide path 6a and the second waveguide path 6b. The first and second phase modulator sections 3 and 4 are provided with electrodes, which may be eliminated when no voltage is applied thereto.

According to this invention, the two waveguide paths 6a and 6b which constitute the first and second phase modulator sections 3 and 4 are so designed as to have different equivalent refractive indexes. The first and second phase modulator sections 3 and 4 are designed in such a way that with no modulated electric signal (signal voltage) applied to the phase modulator sections 3 and 4, lights waveguided through the first and second phase modulator sections 3 and 4 have a phase difference of $(2N+1)\pi$ (N: 0 or a positive integer). The two phase modulator sections 3 and 4 may have the same structure. In this case, with no modulated electric signal (signal voltage) applied to one of the phase modulator sections, a constant voltage ($V\pi$) is applied to the electrode of the other phase modulator section so that lights waveguided through the first phase modulator section and the second phase modulator section have a phase difference of $(2N+1)\pi$ (N: 0 or a positive integer).

Figure 6A:
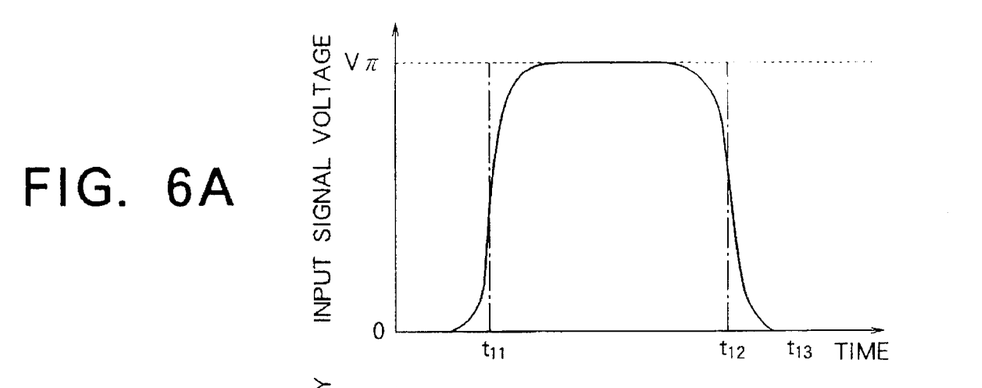
FIG. 6A is a graph showing a modulation electric signal to be applied to an electrode.
Figure 6B:
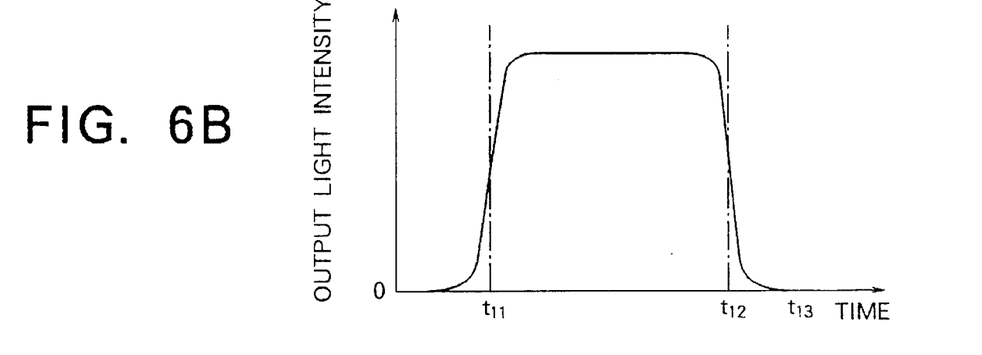
FIG. 6B is a graph showing the intensity of output light.
Figure 6C:
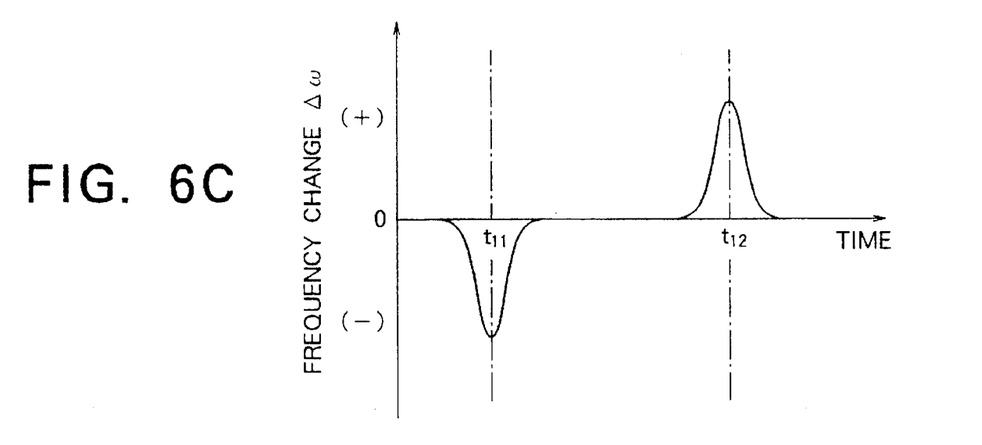
FIG. 6C is a graph showing a frequency change of output light.

FIG. 6A is a graph showing a modulation electric signal to be applied to the first phase modulator section 21 by plotting the input signal voltage on the vertical scale and time on the horizontal scale, FIG. 6B is a graph showing the intensity of output light by plotting the output light intensity on the vertical scale and time on the horizontal scale, and FIG. 6C is a graph showing a frequency change of output light by plotting a frequency change on the vertical scale and time on the horizontal scale. In the case where this MZ modulator is used to modulate light, for example, no voltage (voltage of 0) or a constant voltage (voltage of $V\pi$) is applied to the electrode of the second phase modulator section 4. A signal voltage shown in FIG. 6A is applied as a modulation electric signal to the electrode of the first phase modulator section 3. As a result, the light OFF state is acquired when the voltage of 0 is applied to the first phase modulator section 3 ($0-t_{11}$, $t_{12}-t_{13}$) and the light ON state is acquired when the voltage of $V\pi$ is applied to the first phase modulator section 3 ($t_{11}-t_{12}$).

Given that $E_1\exp(-\alpha_1 L/2)\exp j(\omega t-\beta_1 L)$ is the phase of light wave traveled through the first phase modulator section 3, $E_2\exp(-\alpha_2 L/2)\exp j(\omega t-\beta_2 L)$ is the phase of light wave traveled through the second phase modulator section 4 and $C\exp j(\omega t-\Phi)$ represents the synthesized wave, a phase change $\Phi$ of the synthesized light is given by the following equation (1):

$$\Phi=(\bar{\beta})L+\tan^{-1}[\{(A-B)/(A+B)\}\tan(\Delta\beta L/2)] \quad (1)$$

where $(\bar{\beta})=(\beta_1+\beta_2)/2$ $\Delta\beta=\beta_1-\beta_2$ $A=E_1\exp(-\alpha_1 L/2)$ $B=E_2\exp(-\alpha_2 L/2)$ $\alpha_1$: light absorption coefficient of the first phase modulator section 3

$\alpha_2$: light absorption coefficient of the second phase modulator section 4

$\beta_1$: propagation coefficient of the first phase modulator section 3

$\beta_2$: propagation coefficient of the second phase modulator section 4, and

L: length of each phase modulator section.

A change $\Delta\omega$ of the angular frequency of the output light which occurs at the time of modulation is given by differential of the phase change $\Phi$ with respect to time t as expressed by the following equation (2).

$$\Delta\omega(t)=-d\Phi/dt \quad (2)$$

According to this invention, as mentioned above, the structures of the waveguide paths or the driving method is set in such a way that with no modulation input signal applied, the phase difference between the lights immediately after passing the two phase modulator sections 3 and 4 becomes $(2N+1)\pi$. The time-dependent change $\Delta\omega(t)$ of the angular frequency when a voltage corresponding to an electric signal is applied only to, for example, the first phase modulator section 3 can easily be computed from the equations (1) and (2). As shown in FIG. 6C, the time-dependent change $\Delta\omega(t)$ of the angular frequency acquired indicates a negative value at the point of transition ($t_{11}$) to the ON state of the electric signal from the OFF state. This time-dependent change $\Delta\omega(t)$ indicates a positive value at the transitional point ($t_{12}$) to the OFF state of the electric signal from the ON state. Therefore, the angular frequency shows a tendency to increase from the beginning of the output light pulse to the end thereof, thus generally generating negative chirping.

The degree of this negative chirping depend on the light absorption coefficients $\alpha_1$ and $\alpha_2$ and the ratio of the intensities (or the amplitude ratio) of lights traveling through the first and second phase modulator sections 3 and 4. The degree of this negative chirping can therefore be changed freely by adjusting those values. This feature of this invention allows negative chirping suitable for long distance transmission to be produced by the system which drives only one of the phase modulator sections.

Figure 7A:
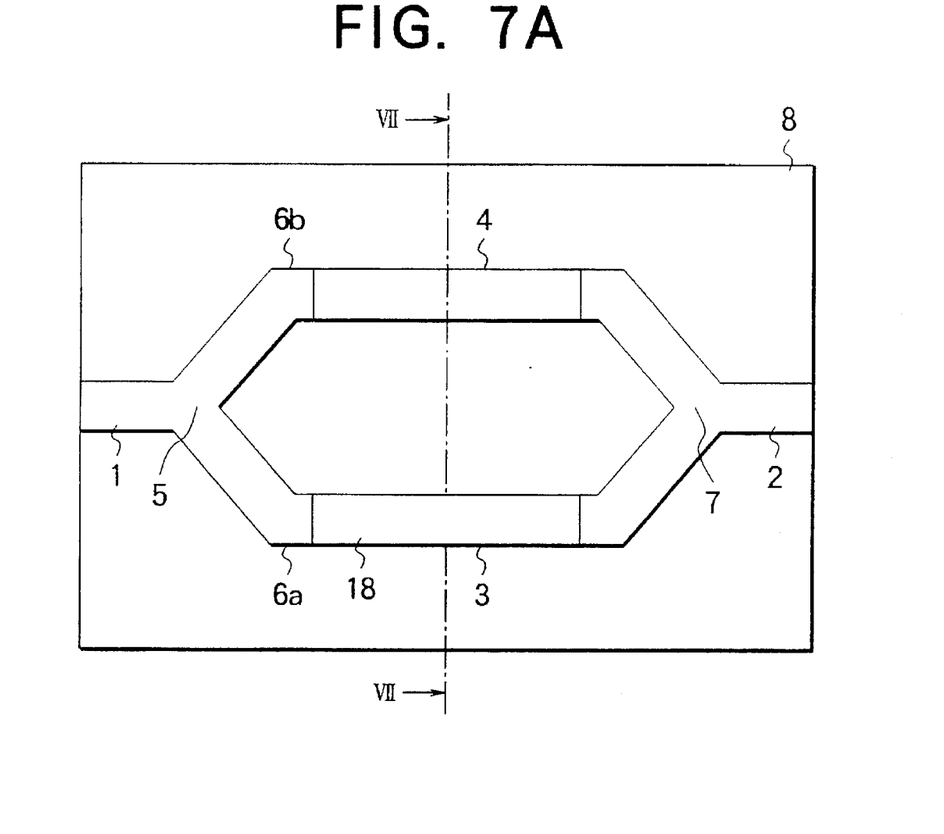
FIG. 7A is a plan view showing the structure of an MZ modulator according to the first embodiment of this invention.
Figure 7B:
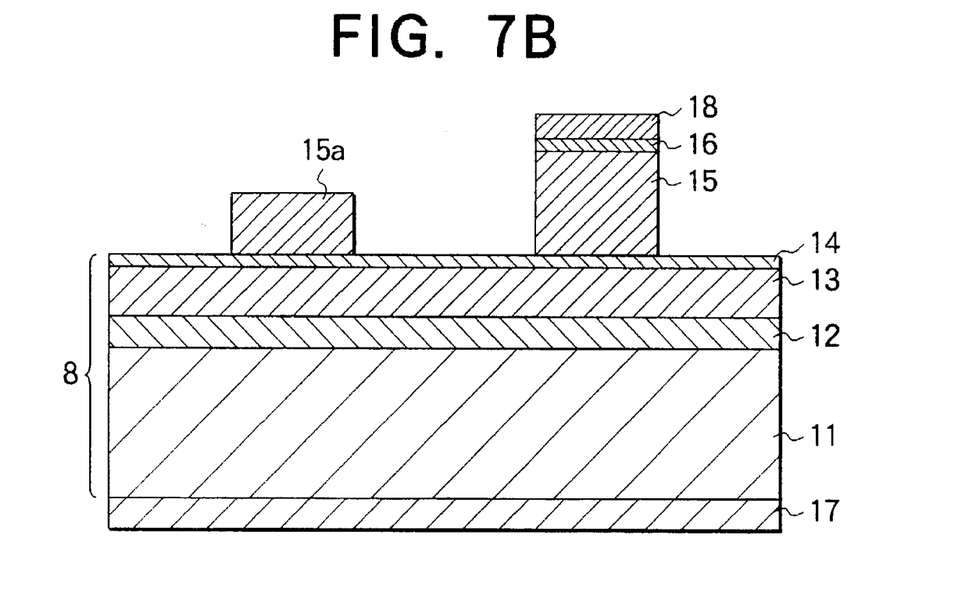
FIG. 7B is a cross-sectional view along the line VII—VII in FIG. 7A.

Some embodiments of this invention will now be described more specifically. FIG. 7A is a plan view showing the structure of an MZ modulator according to the first embodiment of this invention, and FIG. 7B is a cross-sectional view along the line VII—VII in FIG. 7A. The MZ modulator shown in FIG. 7 differs from the one in FIG. 5 only in that the second phase modulator section 4 is provided with no electrode. To avoid the redundant description, therefore, like or same reference numerals are given to those components in FIG. 7 which are the same as the corresponding components shown in FIG. 5.

The device of the MZ modulator is formed on a substrate 8, which has an n-InP buffer layer 12 (for example, the carrier concentration of $5\times10^{17}$ cm$^{-3}$ and the film thickness of 0.5 μm), an i-InGaAsP/InP MQW layer 13 (the InGaASP well: wavelength of 1.52 μm and thickness of 10 nm, the InP barrier: the thickness of 10 nm and the absorption end wavelength as MQW: 1.45 μm) and an i-InP clad layer 14 (the thickness of, for example, 0.2 μm) stacked in this order on an n-InP substrate 11 (the carrier concentration of, for example, $2 \times 10^{16}$ cm$^{-3}$). The first phase modulator section 3 is comprised of a p-InP clad layer 15 (for example, the carrier concentration of $5 \times 10^{17}$ cm$^{-3}$ and the thickness of 1.0 µm) and a p-InGaAs cap layer 16 (for example, the carrier concentration of $1 \times 10^{18}$ cm$^{-3}$ and the thickness of 0.2 µm) formed thereon. The second phase modulator section 4 is comprised of an i-InP clad layer 15a (for example, the thickness of 0.6 µm). A p-type electrode 18 made of Ti/Au is formed on the cap layer 16 and an n-type electrode 17 made of Ti/Au is formed at the back of the substrate 8. The two waveguide paths 6a and 6b, which constitute the first and second phase modulator sections 3 and 4, have widths of 2.5 µm and lengths of 540 µm. In this embodiment, the difference ΔNeff between the equivalent refractive indexes of the first phase modulator section 3 and the second phase modulator section 4 along the light propagating direction, the length L of the phase modulator sections 3 and 4 and the wavelength $\lambda_0$ of incident light (e.g., 1.55 µm) have a relation expressed by the following equation (3).

$$\Delta Neff = \lambda_0/2L \qquad (3)$$

This relationship is the condition for providing a phase difference of π between the light wave passed through the first phase modulator section 3 and the light wave passed through the second phase modulator section 4 when no voltage is applied to the first and second phase modulator sections 3 and 4.

The operation of the MZ modulator according to the first embodiment of this invention will be discussed below with reference to FIGS. 6 and 7. The light wave (wavelength of 1.55 µm) which is waveguided in the incident-light waveguide path 1 is split by the splitter 5 to be sent to the first phase modulator section 3 and the second phase modulator section 4. At this time, the n-type electrode 17 is grounded and a reverse bias voltage corresponding to the modulation electric signal shown in FIG. 6A is applied to the p-type electrode 18 formed on the first phase modulator section 3.

Consequently, when the modulation electric signal (signal voltage) is in the OFF state, as shown in FIG. 6B, the phases of the outgoing lights from the two phase modulator sections are shifted from each other by π and cancel out each other if combined, so that the light OFF state is acquired. When the modulation electric signal (signal voltage) is in the ON state, on the other hand, the phase of the light wave traveled through the first phase modulator section 3 is further shifted by π as compared with the case where the modulation electric signal is in the OFF state. Therefore, the phase difference between the light waves which have passed the first and second phase modulator sections 3 and 4 becomes 2π, ensuring the light ON state. The change Δω(t) of the spontaneous angular frequency of the light output at this time shows a negative value and a positive value respectively at the beginning and end of the signal pulse as shown in FIG. 6C. That is, negative chirping can be generated at the light ON time ($t_{11}$) and the light OFF time ($t_{12}$).

Figure 8A:
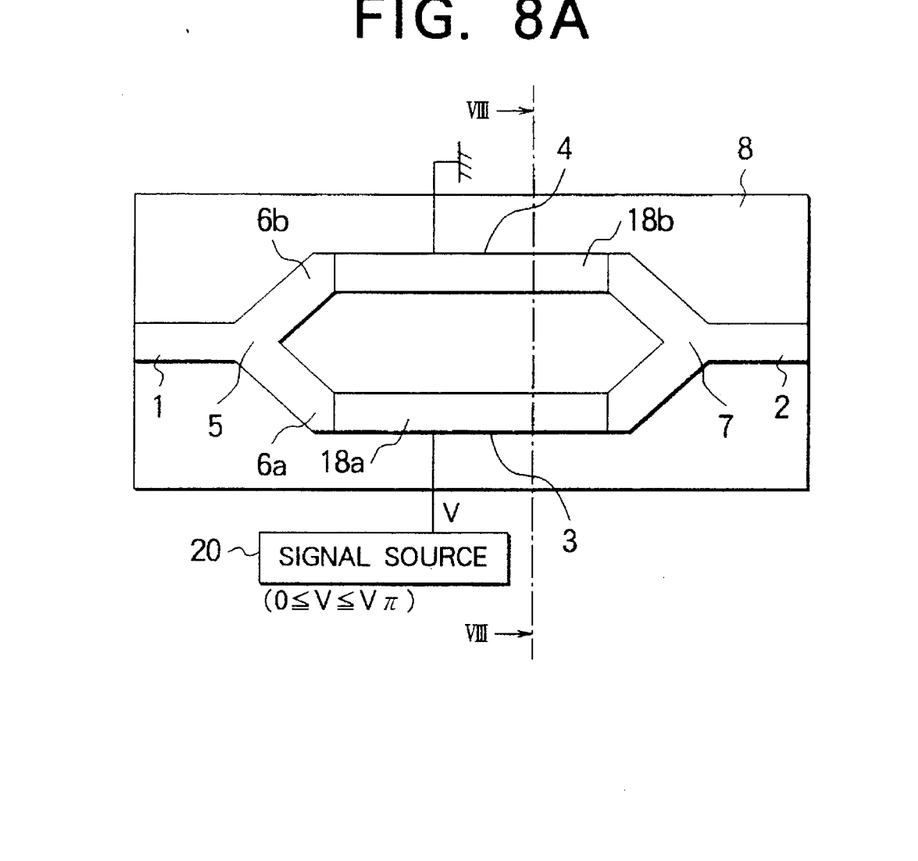
FIG. 8A is a plan view showing the structure of an MZ modulator according to the second embodiment of this invention.
Figure 8B:
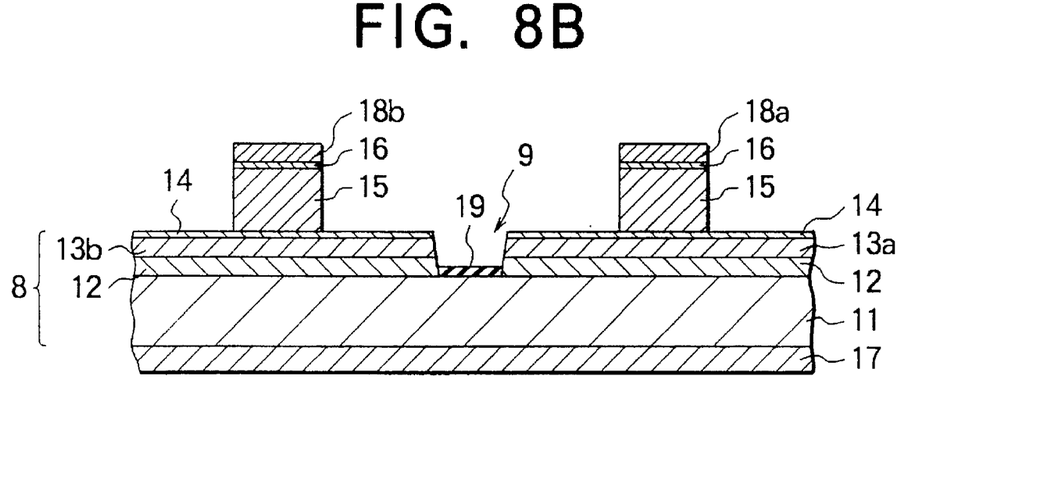
FIG. 8B is a cross-sectional view along the line VIII—VIII in FIG. 8A.

FIG. 8A is a plan view showing the structure of an MZ modulator according to the second embodiment of this invention, and FIG. 8B is a cross-sectional view along the line VIII—VIII in FIG. 8A. To avoid the redundant description, therefore, like or same reference numerals are given to those components in FIG. 8 which are the same as the corresponding components shown in FIG. 7. It is however to be noted that the MZ modulator shown in FIG. 8 has p-type electrodes 18a and 18b respectively formed on the first and second phase modulator sections 3 and 4. A recess 9 is provided between those phase modulator sections 3 and 4, and an i-InGaAsP/InP MQW layer 13a on the first phase modulator section side (3) and an i-InGaAsP/InP MQW layer 13b on the second phase modulator section side (4) have different wavelengths. Further, an SiO$_2$ film 19 is formed on the surface of the n-InP substrate 11 which is exposed by the formation of the recess 9.

As the wavelengths of the MQW layer 13a and the MQW layer 13b differ from each other, the equivalent refractive indexes of the first waveguide path 6a and the second waveguide path 6b become different from each other. In this embodiment, as in the first embodiment, the difference ΔNeff between the equivalent refractive indexes is so set as to satisfy the above-given equation (3) where L is the length of the phase modulator sections and $\lambda_0$ is the wavelength of incident light.

The operation of the thus constituted second embodiment is the same as that of the first embodiment. The p-type electrode 18b of the second phase modulator section 4 and the n-type electrode 17 are grounded, and a reverse bias voltage corresponding to the modulation electric signal shown in FIG. 6A is applied to the p-type electrode 18a of the first phase modulator section 3 by the signal source 20. As a result, as shown in FIG. 6B, when the modulation electric signal is in the OFF state or the signal voltage from the signal source 20 is 0 (V), the difference ΔNeff between the equivalent refractive indexes satisfies the equation (3) so that the phases of the outgoing lights from the two phase modulator sections are shifted from each other by π. Because the phases of those outgoing lights, when synthesized, cancel out each other, the light OFF state is acquired.

When the modulation electric signal is in the ON state or the signal voltage from the signal source 20 is Vπ (V), on the other hand, the phase of the light wave traveled through the first phase modulator section 3 is further shifted by π as compared with the case where the modulation electric signal is in the OFF state. Therefore, the phase difference between the light waves which have passed the first and second phase modulator sections 3 and 4 becomes 2π and the light ON state is acquired. The change Δω(t) of the spontaneous angular frequency of the light output then shows a negative value and a positive value respectively at the beginning and end of the signal pulse as shown in FIG. 6C. That is, negative chirping can be generated at the light ON time and the light OFF time.

Figure 9:
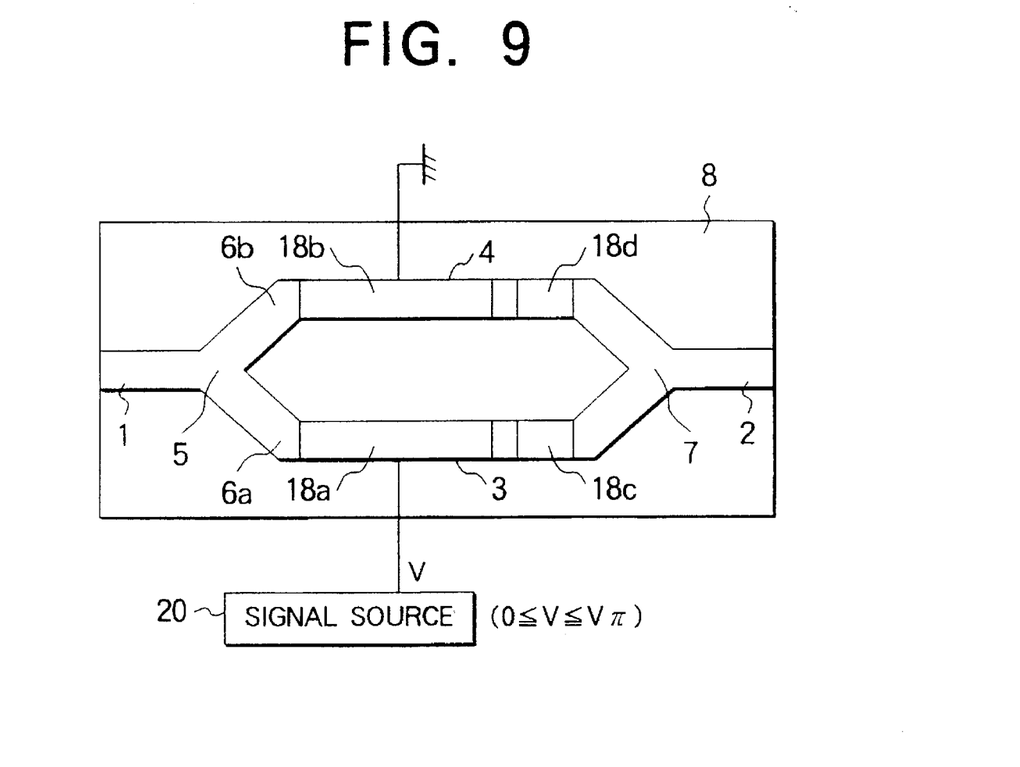
FIG. 9 is an exemplary diagram illustrating the structure of an MZ modulator according to the third embodiment of this invention.

FIG. 9 is an exemplary diagram illustrating the structure of an MZ modulator according to the third embodiment of this invention. To avoid the redundant description, therefore, like or same reference numerals are given to those components in FIG. 9 which are the same as the corresponding components shown in FIG. 8.

The thicknesses of the clad layer 15 and the clad layer 15a are changed in the first embodiment, while the wavelengths of the semiconductor materials (i-InGaAsP/InP MQW layers 13a and 13b) are changed in the second embodiment to set the phase difference of the lights propagating in the two waveguide paths 6a and 6b to (2N+1)π. In the actual fabrication process, however, it is difficult to adjust those factors to accurately set the phase difference of the lights to (2N+1)π. According to this embodiment, therefore, phase adjusting electrodes 18c and 18d are provided in the respective waveguide paths 6a and 6b, apart from the p-type electrodes 18a and 18b. The phase difference of the lights is set to (2N+1)π by applying the proper constant voltage to those electrodes 18c and 18d.

As the operation of the thus constituted third embodiment is the same as those of the first and second embodiments, negative chirping can be produced at the light ON or OFF time by a simpler fabrication process. Although the first and second phase modulator sections 3 and 4 are respectively provided with the phase adjusting electrodes 18c and 18d in this embodiment, such a phase adjusting electrode should not necessarily be provided in both waveguide paths and may be provided only in one of the waveguide paths.

Figure 10:
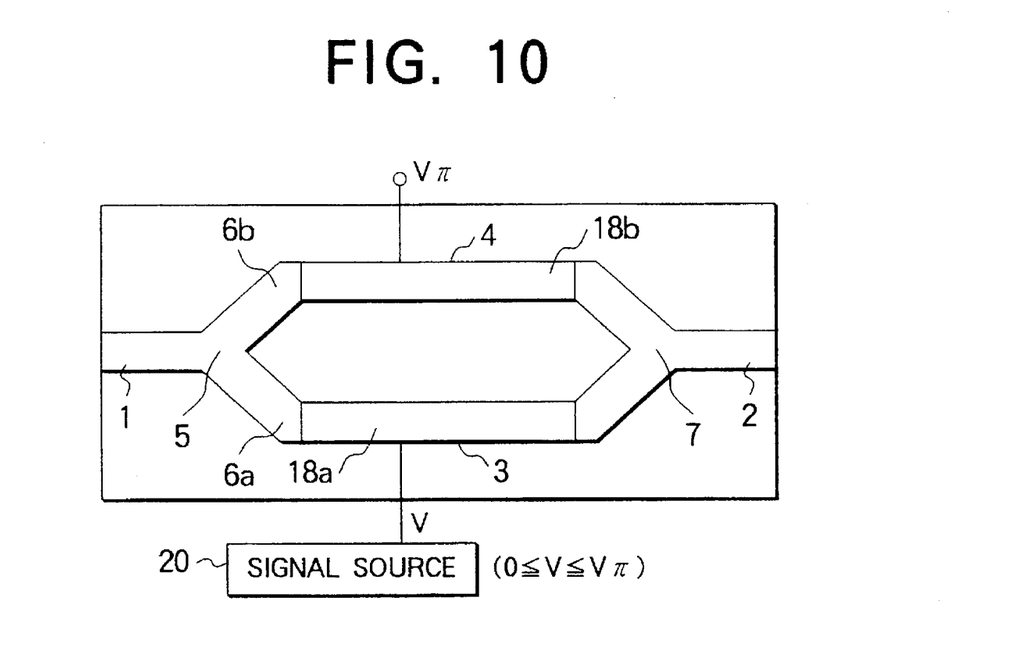
FIG. 10 is an exemplary diagram illustrating the structure of an MZ modulator according to the fourth embodiment of this invention.

FIG. 10 is an exemplary diagram illustrating the structure of an MZ modulator according to the fourth embodiment of this invention. To avoid the redundant description, therefore, like or same reference numerals are given to those components in FIG. 10 which are the same as the corresponding components shown in FIGS. 7 and 8. The first and second phase modulator sections 3 and 4 having the same structure and the same shape are respectively provided in the first and second waveguide paths 6a and 6b. A constant half-wavelength reverse bias Vπ is applied to the electrode of one of the phase modulator sections, for example, the electrode 18b of the second phase modulator section 4, and a reverse bias corresponding to the modulation electric signal shown in FIG. 6A is applied to the electrode 18a of the first phase modulator section 3 by the signal source 20.

Consequently, as shown in FIG. 6B, when the modulation electric signal is in the OFF state or the signal voltage from the signal source 20 is 0 (V), the voltage of Vπ is applied to the electrode 18b of the second phase modulator section 4 so that the phases of the outgoing lights from both phase modulator sections are shifted from each other by π. Therefore, the phases of those outgoing lights, when synthesized, cancel out each other, ensuring the light OFF state. When the modulation electric signal is in the ON state or the signal voltage from the signal source 20 is Vπ (V), on the other hand, the phase of the light wave traveled through the first phase modulator section 3 is further shifted by π as compared with the case where the modulation electric signal is in the OFF state. Therefore, the phase difference between the light waves which have passed the first and second phase modulator sections 3 and 4 becomes 2π and the light ON state is acquired. As shown in FIG. 6C, the change Δω(t) of the spontaneous angular frequency of the light output then shows a negative value and a positive value respectively at the beginning and end of the signal pulse. That is, negative chirping can be generated at the light ON time and the light OFF time.

As discussed in the foregoing descriptions of the first to fourth embodiments, a negative chirping characteristic suitable for long distance transmission can be obtained by the single electrode driving system, which is required in the actual optical transmission system, by selecting the proper structures of the phase modulator sections of a semiconductor MZ modulator or the proper method of driving the phase modulator sections.

This invention is not limited to the above-described embodiments. Although those embodiments are MZ modulators having an InP base MQW structure, this invention can be adapted to InGaAs/InP MQW's, InGaAs/InGaAsP MQW's, InAlAs/InGaAs MQW's or a bulk waveguide path as well. This invention may also be adapted to an MZ modulator which uses a dielectric material of lithium niobate or the like. Moreover, this invention is not limited to the shapes of the devices in the illustrated embodiments, i.e., the thicknesses of the individual layers, the compositions, the sizes of the waveguide paths.

What is claimed is:

1. A Mach-Zehnder modulator comprising:
    a substrate; and
    a device formed on said substrate, said device having,
    an incident-light waveguide path for waveguiding incident light,
    a splitter for splitting light waveguided by said incident-light waveguide path to two,
    first and second waveguide paths for waveguiding lights split by said splitter, said first and second waveguide paths having different equivalent refractive indexes, said first waveguide path having a first phase modulator section to which a modulation electric signal is applied, said second waveguide path having a second phase modulator section,
        with no modulation electric signal applied to said first phase modulator section, lights waveguided through said first phase modulator section and said second phase modulator section having a phase difference of (2N+1)π (N: 0 or a positive integer),
    a mixer for synthesizing output light from said first waveguide path and output light from said second waveguide path, and
    an outgoing-light waveguide path for guiding synthesized light from said mixer.

2. The Mach-Zehnder modulator according to claim 1, wherein each of said first waveguide path and said second waveguide path is comprised of a semiconductor layer and a clad layer formed on said semiconductor layer, said clad layer constituting said first waveguide path has a thickness different from that of said clad layer constituting said second waveguide path so that said equivalent refractive indexes of said first and second waveguide paths differ from each other, and with no modulation electric signal applied to said first phase modulator section, lights waveguided through said first phase modulator section and said second phase modulator section have a phase difference of (2N+1)π (N: 0 or a positive integer).

3. The Mach-Zehnder modulator according to claim 1, wherein each of said first waveguide path and said second waveguide path is comprised of a semiconductor layer, said semiconductor layer constituting said first waveguide path has a refractive index different from that of said semiconductor layer constituting said second waveguide path so that said equivalent refractive indexes of said first and second waveguide paths differ from each other, and with no modulation electric signal applied to said first phase modulator section, lights waveguided through said first phase modulator section and said second phase modulator section have a phase difference of (2N+1)π (N: 0 or a positive integer).

4. A Mach-Zehnder modulator comprising:
    a substrate; and
    a device formed on said substrate, said device having,
    an incident-light waveguide path for waveguiding incident light,
    a splitter for splitting light waveguided by said incident-light waveguide path to two,
    first and second waveguide paths for waveguiding lights split by said splitter, said first and second waveguide paths having different equivalent refractive indexes, said first waveguide path having a first phase modulator section to which a modulation electric signal is applied, said second waveguide path having a second phase modulator section, a phase adjusting electrode being provided in at least one of said first and second waveguide paths to apply a voltage to light waveguided through said at least one of said first and second waveguide paths to adjust a phase of said waveguide light,
        with no modulation electric signal applied to said first phase modulator section, lights waveguided through said first phase modulator section and said second phase modulator section having a phase difference of $(2N+1)\pi$ (N: 0 or a positive integer), a mixer for synthesizing output light from said first waveguide path and output light from said second waveguide path, and an outgoing-light waveguide path for guiding synthesized light from said mixer.

5. A method of driving a Mach-Zehnder modulator comprising a substrate and a device formed on said substrate, said device having, an incident-light waveguide path for waveguiding incident light, a splitter for splitting light waveguided by said incident-light waveguide path to two, first and second waveguide paths for waveguiding lights split by said splitter, said first waveguide path having a first phase modulator section to which a modulation electric signal is applied, said second waveguide path having a second phase modulator section, a mixer for synthesizing output light from said first waveguide path and output light from said second waveguide path, and an outgoing-light waveguide path for guiding synthesized light from said mixer, said method comprising a step of applying a constant voltage to said second phase modulator section and applying a modulation electric signal to said first phase modulator section in such a manner that with no modulation electric signal applied to said first phase modulator section, lights waveguided through said first phase modulator section and said second phase modulator section have a phase difference of $(2N+1)\pi$ (N: 0 or a positive integer), thereby generating negative chirping on a signal of outgoing light from said outgoing-light waveguide path.

6. A method of driving a Mach-Zehnder modulator comprising a substrate and a device formed on said substrate, said device having, an incident-light waveguide path for waveguiding incident light, a splitter for splitting light waveguided by said incident-light waveguide path to two, first and second waveguide paths for waveguiding lights split by said splitter, said first waveguide path having a first phase modulator section to which a modulation electric signal is applied, said second waveguide path having a second phase modulator section, with no modulation electric signal applied to said first phase modulator section, lights waveguided through said first phase modulator section and said second phase modulator section having a phase difference of $(2N+1)\pi$ (N: 0 or a positive integer), a mixer for synthesizing output light from said first waveguide path and output light from said second waveguide path, and an outgoing-light waveguide path for guiding synthesized light from said mixer, said method comprising the step of applying a modulation electric signal to said first phase modulator section without applying a voltage to said second phase modulator section, thereby generating negative chirping on a signal of outgoing light from said outgoing-light waveguide path.

* * * * *